United States Patent
Ohkubo

(12) 
(10) Patent No.: US 6,504,568 B1
(45) Date of Patent: Jan. 7, 2003

(54) LINE RESERVING SYSTEM FOR MULTIPOINT TELECONFERENCE

(75) Inventor: Atsushi Ohkubo, Tokyo (JP)

(73) Assignee: NEC Corporation (JP)

(*) Notice: Subject to any disclaimer, the term of this patent is extended or adjusted under 35 U.S.C. 154(b) by 177 days.

(21) Appl. No.: 09/645,068

(22) Filed: Aug. 23, 2000

Related U.S. Application Data

(63) Continuation of application No. 09/243,007, filed on Feb. 2, 1999.

(30) Foreign Application Priority Data

Feb. 2, 1998 (JP) ............................................. 10-35458

(51) Int. Cl.[7] ................................................. H04N 7/14
(52) U.S. Cl. ............................... 348/14.08; 348/14.07; 348/14.12
(58) Field of Search .......................... 348/14.01, 14.02, 348/14.03, 14.04, 14.05, 14.07, 14.08, 14.09, 14.1, 14.11, 14.12; 709/204, 205, 225; 345/751, 753; H04N 7/14

(56) References Cited

U.S. PATENT DOCUMENTS

| | | | |
|---|---|---|---|
| 5,541,639 A | | 7/1996 | Takatsuki et al. |
| 5,996,003 A | | 11/1999 | Namikata et al. |

FOREIGN PATENT DOCUMENTS

| | | | | |
|---|---|---|---|---|
| JP | 404253459 A | * | 9/1992 | ............ H04M/3/32 |
| JP | 407044930 A | | 2/1995 | |
| JP | 407200472 A | * | 8/1995 | ............ G06F/15/00 |
| JP | 409172509 A | * | 6/1997 | ............ H04M/15/00 |

* cited by examiner

Primary Examiner—Melur Ramakrishnaiah
(74) Attorney, Agent, or Firm—Dickstein, Sharpiro, Morin & Oshinsky, LLP

(57) ABSTRACT

In a teleconference system, the computer disposed in each teleconference terminal apparatus for line reservation becomes unnecessary. An image generator of a center generates image information to display a list of numeric and nonnumeric characters. An image display unit of the teleconference terminal apparatus receives the image information via a communication line to display a list of numeric and nonnumeric characters on a monitor screen. When a user operates a position input operation from an input device, the input device accordingly generates positional information, and a pointer display unit display a pointer image at a position of the monitor screen indicated by the positional information. Each time the user moves the pointer image to a position of a desired numeric or nonnumeric character and conducts a selection determining operation from the input device, an information transmitter sends positional information to the center. In the center, an information receiver receives the positional information. In accordance with the image and positional information, a line reserving unit recognizes time and a user by interpreting numeric and nonnumeric characters thus selectively inputted and reserves a communication line.

9 Claims, 4 Drawing Sheets

LINE RESERVING SYSTEM FOR MULTIPOINT TELECONFERENCE

This is a continuation of application Ser. No. 09/243,007, filed Feb. 2, 1999.

BACKGROUND OF THE INVENTION

The present invention relates to a line reserving system for a multipoint teleconference.

DESCRIPTION OF THE PRIOR ART

In a multipoint teleconference, a communication line is reserved when a user of the system transmits predetermined information from a teleconference terminal apparatus to a center of the system. To achieve the line reservation, the conventional multipoint teleconference system includes a computer on each side of the teleconference terminal and the teleconference center. Namely, a communication line is reserved through an intercommunication between the computers.

FIG. 1 shows in a block diagram a conventional example of the multipoint teleconference system. In this connection, the configuration of FIG. 1 primarily includes constituent elements directly associated with the line reservation. Other known components related to the teleconference are not shown or are shown in a simplified fashion.

The teleconference system 102 includes a plurality of teleconference terminal apparatuses 106 mutually connected to each other via an integrated services digital network (ISDN) 104 and a center 108 connected via the ISDN 104 to the teleconference systems 102 teleconference terminal apparatuses 106). Each terminal apparatus 106 includes a user terminal 110, an input device 112, and a television monitor 114. On the other hand, the center 108 includes a center terminal 116 and a multipoint teleconference controller 118. Furthermore, the teleconference terminal 106 includes a computer 120 and the center 108 includes a computer 122. The computers 120 and 122 are connected to each other via a local area network (LAN) 124.

The user terminal 110 of the terminal apparatus 106 fundamentally includes functions for the teleconference such as a function for the encoding and decoding of video and audio signals, a function for the connection to the ISDN 104, and a function to process signals received from the input device 112. Similarly, the center terminal 108 includes fundamental functions for the teleconference, for example, a function for the encoding and decoding of video and audio signals and a function for the connection to the ISDN 104.

As is well known, the teleconference terminal 106 operates under supervision of the controller 118 of the center 108 to receive video and audio signals via the ISDN 104 so as to present images of users and the like on the monitor screen 114 for the teleconference.

Before a teleconference is held, the user is required to reserve a communication line for the conference. The line reservation is accomplished by the computer 120 of the terminal apparatus 106. Concretely, the user operates the input device 112 in a predetermined manner to display a screen image for line reservation on the monitor 114.

The image includes input fields for time of the teleconference, a user's name, a name of a user to attend the conference, and the like. From the input device 112, the terminal user inputs information necessary for each field of the image. As a result, the computer 120 recognizes the details of the line reservation and then sends the inputted information via the LAN 124 to the computer 122 of the center 108. The computer 122 reserves lines in accordance with the information from the computer 120 to establish connections of lines from the teleconference terminal 106 to the controller 118.

The line reservation above is essential for a smooth operation of the teleconference and hence an ordinary multipoint teleconference system includes the line reserving function.

However, since the line reservation above requires the computers 120 and 122 dedicated for the reservation and the LAN 124, the conventional multipoint teleconference system 102 becomes expensive. Moreover, for example, when the software installed in the computer 120 is to be updated for a higher performance of the line reservation, an engineer is required to visit each installation site of the teleconference terminal 106 for the update of the software.

SUMMARY OF THE INVENTION

It is therefore an object of the present invention, which has been devised to remove the drawback above, to provide a line reserving system for a multipoint teleconference in which the computer dedicated for the line reservation for each teleconference terminal apparatus becomes unnecessary. This leads to decrease in the cost and increase in maintainability.

To achieve the object in accordance with the present invention, there is provided a line reserving system for a multipoint teleconference including a plurality of reserving terminals connected to each other via communication lines and a reservation center. The reservation center includes image generating means for generating image information to display a list of numeric and nonnumeric characters or a list of numeric or numeric characters and the reserving terminal includes a display, image display means for receiving via the communication line the image information from the image generating means of the reservation center and displaying in a screen of the display a list of numeric and nonnumeric characters or a list of numeric or numeric characters in accordance with the received image information, input device capable of a position input operation and a selection determining operation pointer display means for displacing a pointer image at a position of the screen indicated by positional information generated by the input device in response to the position input operation conducted from the input device, and information transmitting means for transmitting via the communication line to the reservation center the positional information being produced from the input device when the selection determining operation is conducted in the input device. The reservation center further includes information receiving means for receiving via the communication line the positional information from the information transmitting means of the reserving terminal and line reserving means for reserving communication lines in accordance with the image information created from the image generating means and the positional information received by the information receiving means.

In the line reserving system for a multipoint teleconference in accordance with the present invention, the image generating means of the reservation center generates image information to display numerals or characters in a list or both of numerals and characters in a list. In the reservation terminal, the image display means receives the image information via the communication line from the image generating means and then displays in accordance with the received information a list of numerals or characters or a list of both of numerals and characters. On the other hand, when a user inputs a position from the input device, the input device outputs positional information in response to the operation. The pointer display means displays a pointer image on a screen of the display at a position indicated by the positional information.

While visually checking the image of the screen of the display, the user operates the input device to move the pointer image to a position of a desired numeral or character and then conducts a selection determining operation. Then, the information transmitting means sends positional information being produced from the input device via the communication line to the reservation center. In the center, the information receiving means receives the position information and the line reserving means reserves lines in accordance with the image information generated by the image generating means and the positional information received by the information receiving means.

Consequently, for example, when a value of time is to be specified for the teleconference, the user moves the pointer image over numerals indicating the time in a sequential manner and conducts the selection determining operation for each of the numeral. Resultantly, positional information of the numerals representing the time is sent to the reservation center. When information of the reserving user is to be sent to the reservation center, it is only necessary for the user to similarly select numerals representing, e.g., an identification number of the reservation terminal being operated. Furthermore, when a name of the user is to be notified to the center, the user need only select characters representing the name in the similar manner. In addition, to report persons attending the teleconference, it is only required to send, for example, an identification number of each teleconference terminal to the reservation center in accordance with the procedure above.

In the center, the numeric and/or nonnumeric characters selectively inputted by the user from the reservation terminal can be recognized in accordance with the positional information received by the information receiving means.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the accompanying drawings, description will be given of an embodiment in accordance with the present invention.

Figure 2:
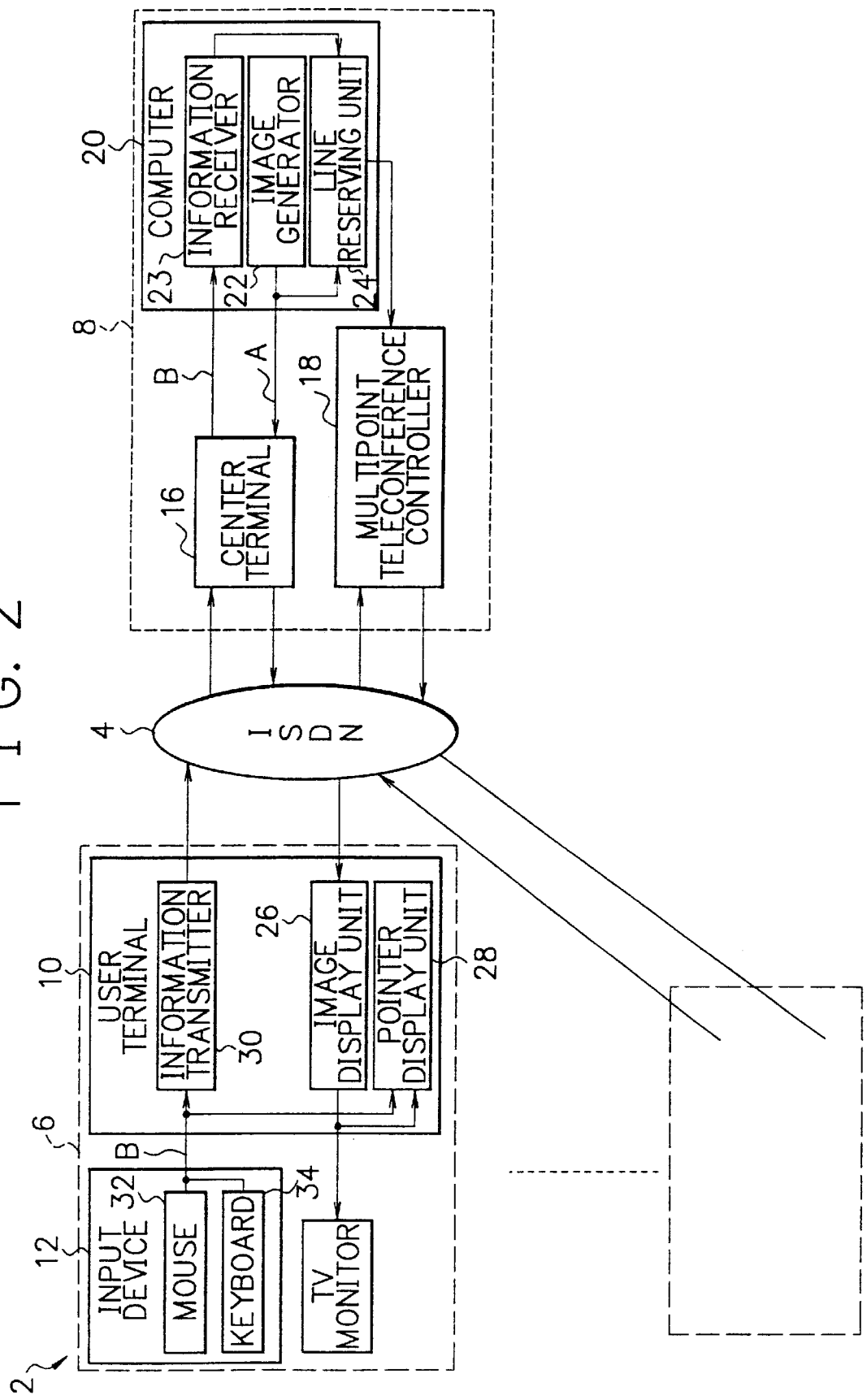
FIG. 2 is a block diagram showing a line reserving system for a multipoint teleconference in accordance with the present invention.
Figure 3:
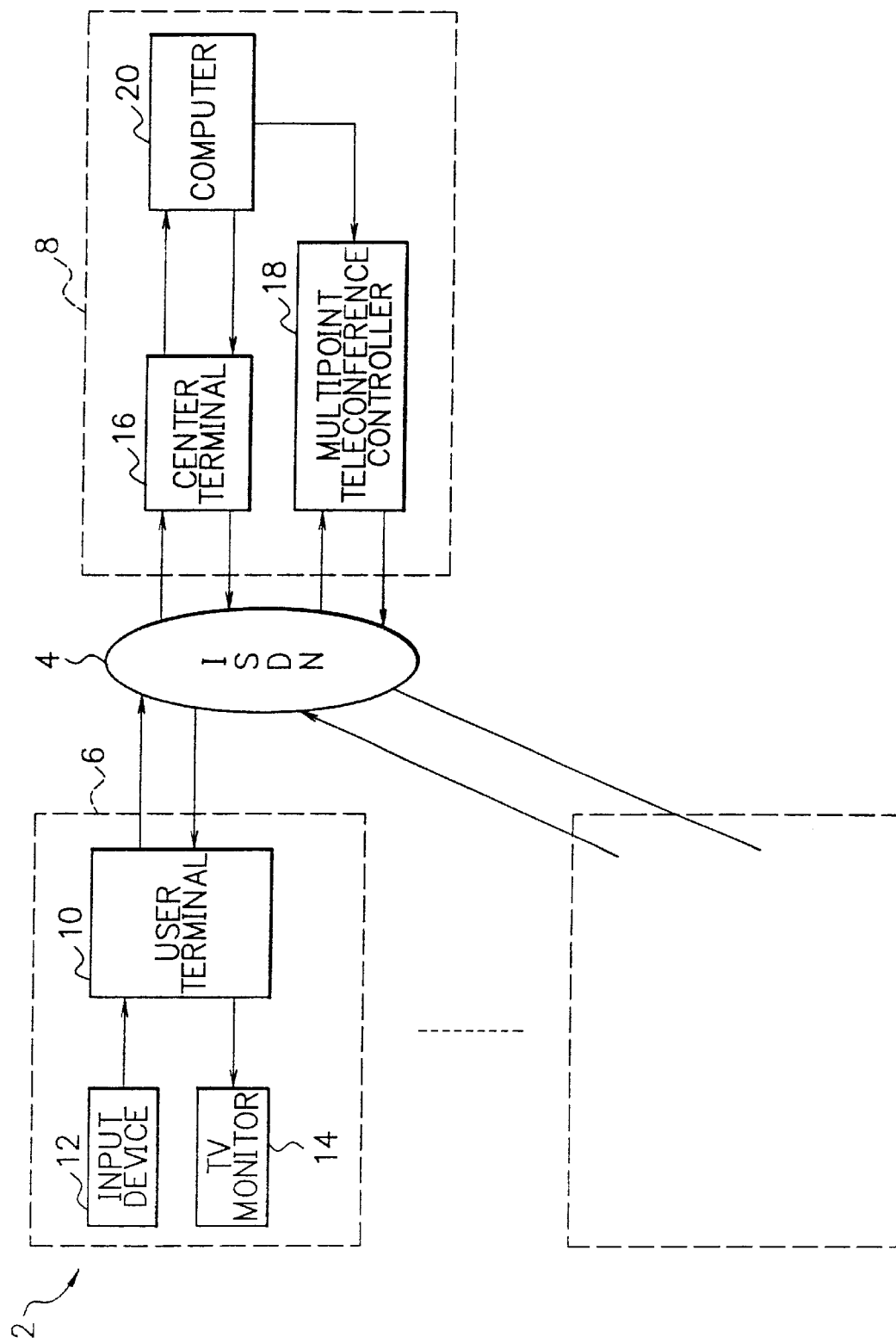
FIG. 3 is a block diagram showing a basic configuration of the line reservation system of FIG. 2.

FIG. 2 shows in a block diagram an embodiment of the line reserving system for a multipoint teleconference in accordance with the present invention and FIG. 3 shows in a block diagram a fundamental construction of the reservation system of FIG. 2. In these diagrams, the same reference numerals are assigned to the same constituent elements. The configurations primarily include components directly related to the line reservation. Namely, the elements associated with the know teleconference are not shown or are shown in a simplified manner.

The line reservation system above is installed for the line reservation in a multipoint teleconference system 2. The system 2 includes a plurality of teleconference terminal apparatuses 6 connected to each other via an ISDN 4 and a center 8 linked via the ISDN 4 to each of the terminal apparatuses 6. While each apparatus 6 serves as a reserving terminal associated with the present invention, the center 8 functions as a reservation center in accordance with the present invention.

The terminal apparatus 6 includes a user terminal 10, an input device 12, and a television monitor 14 serving as a display related to the present invention. On the other hand, the center 8 includes a center terminal 16, a multipoint teleconference control unit 18, and a computer 20.

The user terminal 10 of the apparatus 6 has fundamental functions to achieve a teleconference such as a function for the encoding and decoding video and audio signals, a function to establish connections to the ISDN 4, and a function to process signals received from the input device 12. Furthermore, the center terminal 16 similarly includes basic functions for the teleconference, for example, a function to encode video and audio signals and to decode the encoded signals and a function of establishing connections to the ISDN 4.

In the configuration, as is already known, each teleconference terminal apparatus 6 receives under supervision of the conference controller 18 of the center 8 audio and video signals via the ISDN and displays video images of users and like items on the monitor 14 to thereby support the teleconference.

Figure 1:
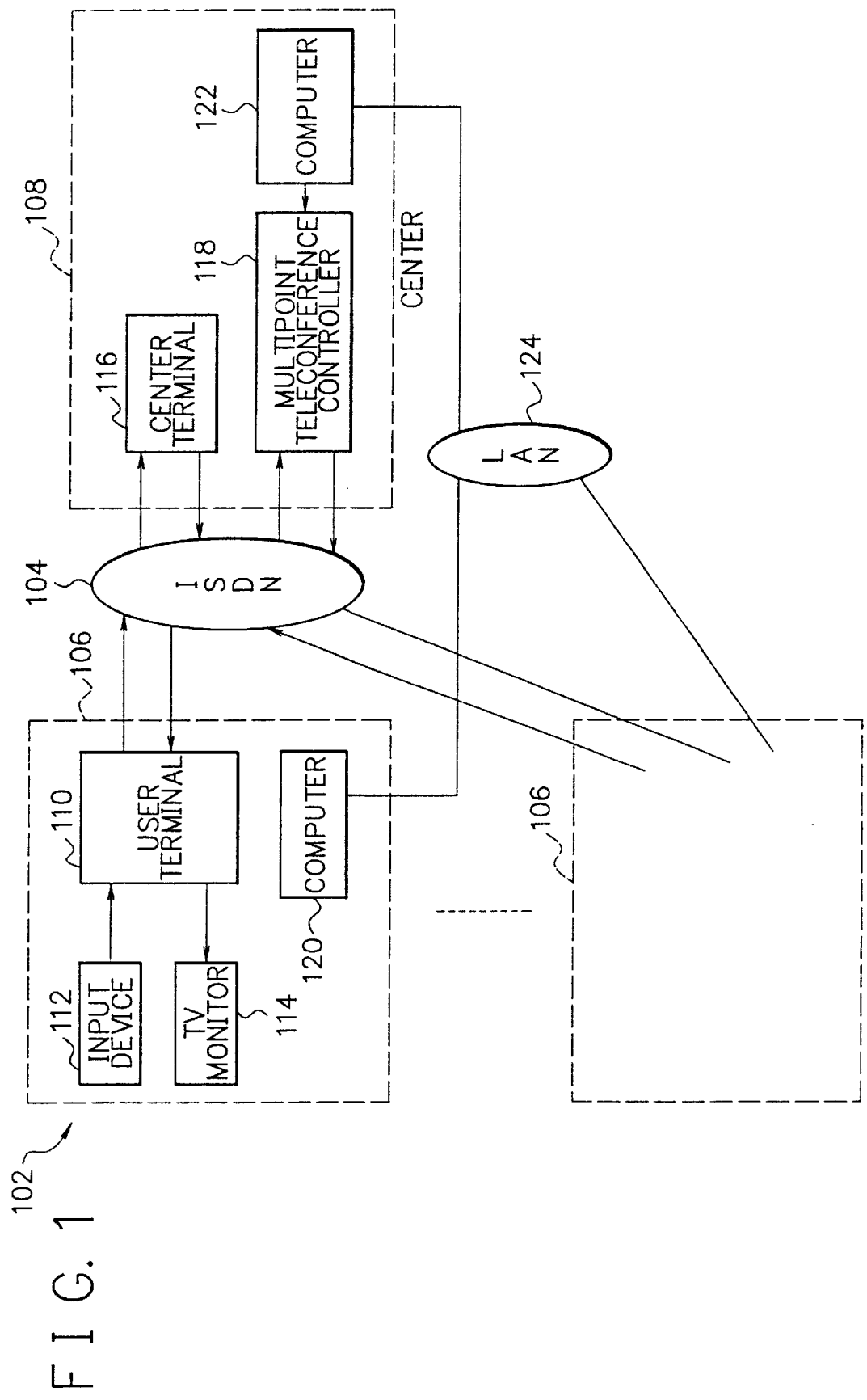
FIG. 1 is a schematic block diagram showing an example of a conventional teleconference system.

The computer 20 of the center 8 includes as means for implementing functions associated with the present invention an image generator 22, an information receiver 23, and a line reserving unit 24 as already shown in FIG. 1.

The image generator 22 generates image information to display a list including numerals and characters or letters other than the numeric characters in this embodiment.

The information receiver 23 receives via the ISDN 4 and the center terminal 16 positional information from information transmitting means 30.

The line reserving unit 24 reserves communication lines in accordance with image information created by the image generator 22 and the positional information which is sent from the terminal apparatus 6 and which is received by the information receiver 23.

On the other hand, the user terminal 10 of the apparatus 6 includes an image display unit 26, a pointer displaying unit 28 and an information transmitter 30 in accordance with the present invention.

The image display unit 26 receives image information via the image generator 22 of the center 8 and the ISDN 4 and then displays a list of numeric and nonnumeric characters on a screen of the monitor 14.

In addition, when the input device 12 is operated, the pointer display unit 28 displays a pointer image on the screen at a position indicated by the positional information sent from the input device 12.

When an operation to confirm the selection is carried out in the input device 12, the information transmitter 30 sends the positional information of the input device 12 via the ISDN 4 to the reservation center 8.

In this regard, the input device 12 of the embodiment includes as an example a mouse 32 and a keyboard 34 as shown in FIG. 2.

Next, description will be given of operation of the line reserving system in conjunction with the multipoint teleconference system 2.

When the user operates the keyboard 34 of the input unit 12 to initiate a line reservation, the user terminal 10 sends a predetermined signal indicating the initiation of line reservation via the ISDN 4 to the center 8. In the center 8, the computer 20 receives the signal via the center terminal 16.

Figure 4:
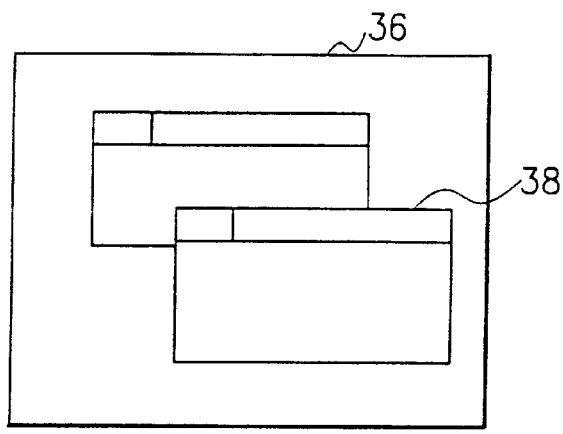
FIG. 4 is a schematic diagram showing an example of an image displayed on a screen of a television monitor.

As a result, the image generator 22 associated with the computer 20 generates image information A for a list of numeric and nonnumeric characters to send information A via the terminal 16 and the ISDN to the teleconference user terminal 6. In the terminal, the image display unit 26 receives the image information A and then display on the screen of the monitor 14 numeric and nonnumeric characters in a list in accordance with the received information A. FIG. 4 schematically shows an example of the image displayed on the monitor 14 in the operation. In the screen 36 of the monitor 14, there is displayed a predetermined area 38 in which, for example, numeric characters ranging from 0 to 9, not shown, are presented, for example, in a horizontal line and/or nonnumeric characters such as alphabetical letters, not shown, are displayed in a matrix.

On the other hand, when the user operates the mouse 32 of the input device 12 to input a position, the input device 12 responsively produces positional information. The pointer display unit 28 then displays on the monitor 14 a pointer image at a position indicated by the positional information.

Figure 5:
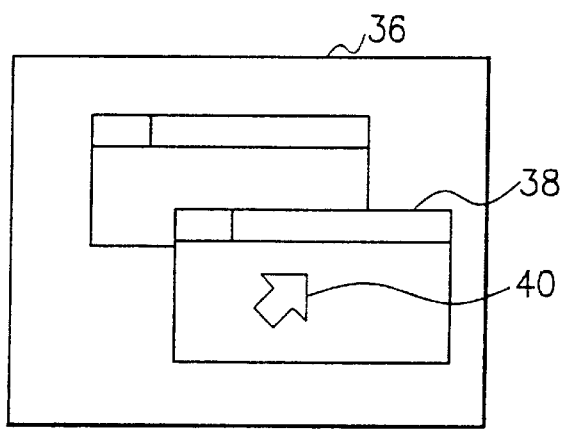
FIG. 5 is a diagram schematically showing an example an image including a pointer image displayed in a television monitor screen.

FIG. 5 illustratively shows an example of the image displayed in the screen 36 of the TV monitor 14. In the screen 36, a pointer image 40 in the shape of an arrow is superimposed onto the numeric and nonnumeric characters in the area 38.

Figure 6:
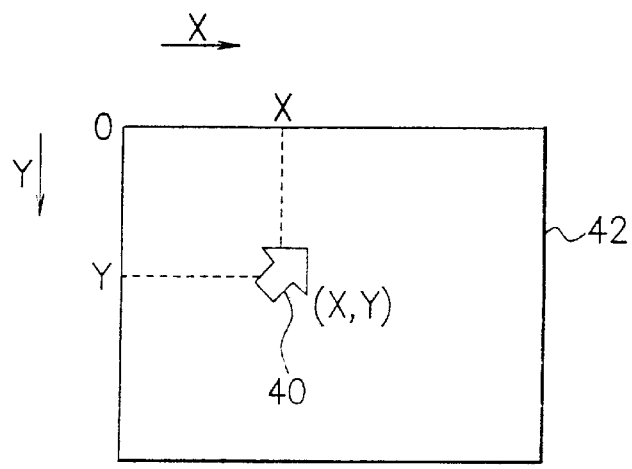
FIG. 6 is a schematic diagram showing positional information which is to be transmitted from an information transmitting means.

While checking the screen image on the monitor 14, when the user moves the mouse 32 to shift the pointer image 40 onto a position of a desired numeric or nonnumeric character and then depresses or clicks, for example, a left button of the mouse 32, the information transmitter 30 sends positional information being generated from the input device 12 via the ISDN 4 to the center 8. FIG. 6 schematically shown positional information B delivered from the transmitter 30. Information B includes coordinate values along the x and y axes on a plane 42 associated with the screen of the monitor 14. In this example, an upper left corner of the screen is an origin and the x and y axes are drawn in the horizontal and vertical directions, respectively.

Consequently, to specify, for example, time for a teleconference, it is only necessary that the user moves the pointer image 40 to numeric characters of the time in a sequential manner and then confirms the selected items for each operation. As a result, positional information of each numeric character of the time is sent to the reservation center. When information of the reserving person is to be sent to the reservation center, it is only required to selectively transmit numeric characters representing, e.g., an identification number of, e.g., the reservation terminal being used as in the case of the time above. When the name of the user is to be reported, the user need only select nonnumeric characters representing the own name to send the name to the reservation center as described above. Moreover, when persons to attend the conference are desired to be notified to the center 8, it is only necessary to send, for example, an identification number of the respective teleconference terminals 6 to the center 8.

In the center 8, the information receiver 23 receives positional information B, and the line reserving unit 24 recognizes, in accordance with the positional information received by the receiver 23, the numeric and/or nonnumeric characters selected by the user and then reserves lines in accordance with the characters selectively inputted by the user.

Consequently, in accordance with the embodiment of the line reserving system for a multipoint teleconference, the computer required to be installed for line reservation in each teleconference terminal apparatus 6 becomes unnecessary. That is, the LAN to establish connection between the computer of the teleconference terminal apparatus 6 and the computer 20 of the center 8 becomes unnecessary. This resultantly makes it possible to decrease the cost of the multipoint teleconference system 2.

Additionally, since the computer 20 is not required to be disposed for the line reservation in the terminal apparatus 6, there can be removed, for example, an operation to update the software installed in the computer 20 to increase performance of line reservation. This consequently improves maintainability of the system 2.

In this connection, the functions respectively of the image display unit 26, the pointer display unit 28, and the information transmitter 30 of the user terminal 10 of the teleconference terminal apparatus 6 can be implemented only by slightly modifying the functions inherently arranged in the user terminal 10. In other words, even if these functions are accomplished by the user terminal 10, the system cost is not particularly increased.

In the embodiment, although the user operates the mouse 32 to input a position and confirm the inputted item for the line reservation, the system configuration may be easily implemented to achieve the operation by use of the keyboard 34 in place of the mouse 32. Specifically, a system can be configured in which when the user operates, for example, a return key of the keyboard 34, the information transmitter 30 sends positional information being produced from the input device 12 to the center 8. Since the mouse 32 is unnecessary in this configuration, it is possible to apply the present invention even when there is missing a position input device such as the mouse 32 in the teleconference terminal apparatus 6.

In addition, a trackball may be also utilized in place of the mouse 32 for the position input device and there may be provided an input device to be exclusively used for the teleconference terminal apparatus 6.

Although both numeric and nonnumeric characters are displayed on the monitor 14 in this embodiment, when the system is configured such that the names of users are not notified to the center 8 and only identification numbers of users and/or terminals are reported thereto, it is only necessary to display numeric characters on the monitor 14. Therefore, the image generator 22 need only generate image information for a list including numeric characters in this situation.

In the line reserving system for a multipoint teleconference in accordance with the present invention described above, the image generator of the reservation center produces image information to display a list of numeric or nonnumeric characters or a list of both thereof. In the reserving terminal, the image display unit receives the image information via the image generator and the communication line and displays on the display screen a list of numeric or nonnumeric characters or a list of both characters in accordance with the received image information. On the other hand, when the user conducts a position input operation from the input device, the input device produces positional information in response to the operation, and the pointer display unit displays on the display screen a pointer image at a position indicated by the positional information.

While visually inspecting the screen image of the display, when the user moves the pointer image by the input device to a position over a desired numeric or nonnumeric character and confirms the selection of the position, the image transmitter sends positional information being generated from the input device via the communication line to the reservation center. In the center, the information receiver receives the positional information and the line reserving unit reserves lines in accordance with the image information created by the image generator and the positional information received by the information receiver.

Consequently, the computer conventionally required for line reservation for each teleconference terminal apparatus is unnecessary in accordance with the present invention. This means that the LAN to connect the computer of the teleconference terminal apparatus to that of the center becomes unnecessary. Resultantly, the multipoint teleconference system can be constructed at a low cost.

In addition, since it is not necessary to arrange the computer for line reservation in each teleconference terminal apparatus one does not need to update the software installed in an computer to improve performance of the line reservation. This advantageously improves maintainability of the system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A line reserving system for a multipoint teleconference, the line reserving system comprising:
    a plurality of reserving terminals connected to each other via communication lines;
    a reservation center connected to each of the reserving terminals through the communication lines;
    the reservation center including an image Generator which generates image information relating to characters to be displayed on the reserving terminals, the characters providing information for line selection to reserve a conference line of the communication lines for the multipoint conference;
    each reserving terminal including:
        a display;
        an image display unit which receives, via a line reserving line of the communication lines, the image information and displays the characters on the display;
        an input device which receives a selection of a user in response to the characters on the display, and
        an information transmitter which transmits, via the line reserving line, the selection of the user to the reservation center;
    reservation center further including:
        an information receiver which receives, via the line reserving line, the selection of the user; and
        a line reserving unit which reserves the conference line in accordance with the selection of the user.

2. A line reserving system for a multipoint teleconference in accordance with claim 1, wherein:
    the reserving terminals are teleconference terminals.

3. A line reserving system for a multipoint teleconference in accordance with claim 1, wherein the image generator, the information receiver, and the line reserving unit are implemented by a computer.

4. A line reserving system for a multipoint teleconference in accordance with claim 1, wherein:
    the input device includes a mouse; and
    the selection of the user is determined by a position input defined by moving the mouse and a selection determination accomplished by a operating a mouse button of the mouse.

5. A line reserving system for a multipoint teleconference in accordance with claim 1, wherein:
    the input device includes a keyboard; and
    the selection of the user is determined by a position input defined by operating a first key of the keyboard and a selection determination accomplished by operating a second key of the keyboard.

6. A line reserving system for a multipoint teleconference in accordance with claim 5, wherein the first key is a key indicating a direction and the second key is a return key.

7. A line reserving system for a multipoint teleconference in accordance with claim 1, wherein the selection of the user is performed using a pointer image, the pointer image being an image indicating an arrow.

8. A line reserving system for a multipoint teleconference in accordance with claim 1, wherein the communication lines are implemented by an ISDN.

9. A method for reserving a communication line in a multipoint teleconference, the multipoint teleconference including a plurality of reserving terminals connected to each other via communication lines and a reservation center connected to each of the reserving terminals through the communication lines, the method comprising the acts of:
    causing the reservation center to perform the act of generating image information relating to characters to be displayed on the reserving terminals, the characters providing information for line selection to reserve a conference line of the communication lines for the multipoint teleconference;
    causing a select reserving terminal to perform the acts of:
        receiving the image information including the characters via a line reserving line of the communication lines;
        displaying the characters to a user;
        receiving a selection of the user in response to the characters; and
        transmitting the selection of the user to the reservation center;
    the reservation center further performing the acts of:
        receiving the selection of the user; and
        reserving the conference line in accordance with the selection of the user.

* * * * *